US005728760A

United States Patent [19]

Rose et al.

[11] Patent Number: 5,728,760
[45] Date of Patent: Mar. 17, 1998

[54] USE OF RING-BROMINATED BENZOATE COMPOUNDS AS FLAME RETARDANTS AND/OR PLASTICIZERS

[75] Inventors: Richard S. Rose, West Lafayette; Bhabatosh Bhattacharya, Lafayette; Nicolai A. Favstritsky, W. Lafayette, all of Ind.

[73] Assignee: Great Lakes Chemical Corporation, West Lafayette, Ind.

[21] Appl. No.: 419,814

[22] Filed: Apr. 11, 1995

[51] Int. Cl.$^6$ .............................. C08J 5/10; C08K 5/09; C08K 5/10; C08K 5/12; C08L 75/04
[52] U.S. Cl. ..................... 524/292; 524/288; 524/290; 524/291
[58] Field of Search ........................ 524/288, 290, 524/291, 292

[56] References Cited

U.S. PATENT DOCUMENTS

| | | | |
|---|---|---|---|
| 5,049,697 | 9/1991 | Bohen et al. | 560/83 |
| 5,208,366 | 5/1993 | Bohen et al. | 560/83 |
| 5,329,054 | 7/1994 | Theriot | 570/142 |

FOREIGN PATENT DOCUMENTS 1025737   6/1989   Japan .

OTHER PUBLICATIONS

Article entitled Use of Tetrabromophthalic Anhydride (TBPA) in the Construction of Fire-Retardant Polyester and Epoxy Resins by Sydney M. Spatz, Herman Stone, Marvin Koral, Russell I. Steiner, and Hervey W. Ackerman, Jr. published in Ind. Eng. Chem. Prod. Res. Devel., vol. 8, No. 4, Dec. 1969.

Article entitled Discoloration of Tetrabromophthalic Anhydride Polyester Resins by Sydnes M. Spatz, Herman Stone, Marvin Koral, Russell I. Steiner, and Hervey W. Ackerman, Jr. published in Ind. Eng. Chem. Prod. Res. Devel., vol. 8, No. 4, Dec. 1969.

Primary Examiner—Joseph L. Schofer
Assistant Examiner—U. K. Rajguru
Attorney, Agent, or Firm—Woodard, Emhardt, Naughton, Moriarty & McNett

[57] ABSTRACT

A method of making flame retarded polyurethanes by including a bromobenzoate compound in the polyurethane mixture. Also disclosed is a method of making flame retarded polyvinyl chlorides, unsaturated polyesters and epoxy resins by incorporating a bromobenzoate compound into the polymer system. The bromobenzoate compounds of the invention may also be used as plasticizers for PVC and rubber.

31 Claims, No Drawings

USE OF RING-BROMINATED BENZOATE COMPOUNDS AS FLAME RETARDANTS AND/OR PLASTICIZERS

FIELD OF THE INVENTION

The present invention relates generally to novel uses for bromobenzoate compounds, and more particularly to their use as combustion modifiers and/or plasticizers in polymeric systems.

BACKGROUND OF THE INVENTION

Compounds containing aromatically bound bromine have previously been used as additives for polyurethanes, polyvinyl chloride, and other polymer systems such as unsaturated polyesters, epoxies, and rubbers, particularly where resistance to thermal and hydrolytic decomposition is desired. In recent years however, unsubstantiated claims that certain of these compounds (such as brominated diphenyl oxides) are hazardous to human health have resulted in a search for members of that class that are demonstrably safe and effective.

Among the requirements for such compounds are that they be flowable liquids with minimal effect upon the physical properties of the polymer. Where there is an effect on the polymer, it is desired that the effect improve the physical properties, such as plasticity.

A need therefore exists for improved combustion modifiers and/or plasticizers for polymers such as polyurethane and polyvinyl chloride. The present invention addresses that need.

SUMMARY OF THE INVENTION

Briefly describing one preferred aspect of the present invention, there is provided a method of making flame retarded polyurethane by including a bromobenzoate compound in the polyurethane mixture. In a second preferred embodiment of the present invention there is provided a method of making flame retarded polyvinyl chlorides by incorporating a bromobenzoate into the polyvinyl chloride. Flame retarded polyurethane and polyvinyl chloride compositions incorporating a flame retardant amount of a bromobenzoate compound also constitute preferred embodiments of the invention. In such methods and compositions, the bromobenzoate compounds provide surprising and unexpected compatibility with the resin systems, affording overall compositions exhibiting excellent physical and chemical properties.

One object of the present invention is to provide methods of improving the physical properties of polyurethane.

Another object of the present invention is to provide methods of improving the physical properties of polyvinyl chlorides.

Additional objects of the invention include the provision of polyurethane, polyvinyl chloride and other polymer resin compositions with surprisingly improved physical properties.

Still further objects and advantages of the invention will be apparent from the following description.

DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the preferred embodiments, and such further applications of the principles of the invention as illustrated herein being contemplated as would normally occur to one skilled in the art to which the invention pertains.

As previously indicated, preferred aspects of the present invention relate to methods for improving the physical characteristics of polyurethanes and polyvinyl chlorides. In particular, the present invention uses ring-brominated benzoates (i.e., bromobenzoate compounds, such as tetrabromobenzoate compounds) as flame retardants and/or plasticizers in polyurethanes and polyvinyl chlorides. Generally, the bromobenzoate compounds are incorporated directly into the polymer to provide the aforementioned beneficial properties.

In this regard, preferred bromobenzoate compounds for use in the present invention include those encompassed by formula (I):

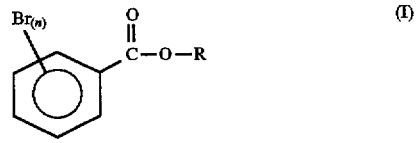

wherein n is an integer from 1 to 5, and R is an organic group having up to about 30 carbon atoms, and optionally being substituted with one or more groups such as alkoxy, halo, amino, thio, and the like. In more preferred bromobenzoates, n is an integer from 1 to 4, most preferably from 2 to 4.

When the bromobenzoates of the present invention are incorporated into polyurethanes, the compositions meet both the physical property and combustibility test criteria for polyurethanes without the health concerns associated with brominated diphenyl oxides. In addition, testing in PVC applications shows bromobenzoates to have surprisingly better compatibility than the prior art compound di(2-ethylhexyl)tetrabromophthalate.

Desired bromobenzoates are preferably prepared by reacting bromophthalic anhydride with the appropriate alcohol in the presence of a decarboxylation catalyst. In one preferred embodiment the reaction is performed in an inert solvent to minimize the creation of phthalates. Benzoic acid or phthalic anhydride having different numbers of bromines on the ring, or mixtures having various levels of bromination, can also be used as starting materials in the synthesis of the benzoates. Thus, in these preparative processes, preferred bromobenzoates will be formed which are encompassed by the formula (II):

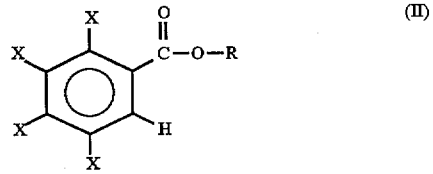

wherein each X, which may be the same as or may differ from one another, is —Br or —H, with the proviso that at least one X is —Br, and R is as defined above in formula (I). Preferred compounds of formula (II) occur where each X is Br.

Examples of bromobenzoates which can be used in the present invention are those prepared from alcohols having a boiling point of between about 160° C. and about 230° C., preferably between 180° C. and 205° C. These alcohols provide the advantage of allowing the decarboxylation reaction to proceed at a reasonable rate, while still allowing for ease of stripping the excess alcohol from the product at the end of the reaction. Preferably the alcohol is a non-halogenated, non-sulfur-containing, non-nitrogen-containing alcohol (and thus R will preferably be free from halogen, sulfur or nitrogen). Branched chain alcohols are most preferred.

Appropriate alcohols with boiling points between about 160° C. and about 230° C. include 2-(2-methoxy) ethoxyethanol, 2-butoxyethanol, 3,3-diethoxy-1-propanol, di(propylene glycol) methyl ether, 2-ethyl-1-hexanol, 3-ethyl-1-hexanol, 3,4-dimethyl-1-hexanol, 3,5-dimethyl-1-hexanol, 3-methyl-1-heptanol, 4-methyl-1-heptanol, 2-octanol, 5-methyl-1-heptanol, 3-octanol, 2-propyl-1-pentanol, 2,6-dimethyl-4-heptanol, 2-nonanol, dihydromyrcenol, 3,5,5-trimethyl-1-hexanol, 3,7-dimethyl-1-octanol, 3,7-dimethyl-3-octanol, mixed $C_7$ and $C_9$ alcohols (hereinafter "mixed $C_7/C_9$ alcohols"), isooctyl alcohol, mixed $C_9$ alcohols, 3-furanmethanol, furfuryl alcohol, tetrahydrofurfuryl alcohol, 3-acetyl-1-propanol, 2-isopropoxyethanol, 3-methoxy-1-butanol, 2-cyclohexen-1-ol, 1,5-hexadien-3-ol, t,t-2,4-hexadien-1-ol, 3-hexyn-1-ol, 5-hexyn-1-ol, cyclopentanemethanol, 4-methyl-1-pentanol, 3-(trimethylsilyl)allyl alcohol, benzyl alcohol, 3-trimethylsilyl-1-propanol, 3-cyclohexen-1-methanol, 3-methyl-2-cyclohexen-1-ol, cycloheptanol, cyclohexylmethanol, 1-methylcyclohexanol, 2-methylcyclohexanol, 3-methylcyclohexanol, 4-methylcyclohexanol, 1-heptanol, 2-heptanol, propylene glycol butyl ether, 2-methylbenzyl alcohol, 3-methylbenzyl alcohol, 4-methylbenzyl alcohol, phenethyl alcohol, sec-phenethyl alcohol, 1-octyn-3-ol, cycloheptanemethanol, 2-cyclohexylethanol, 1-cyclohexylethanol, cyclooctanol, 3-cyclopentyl-1-propanol, 2,3-dimethylcyclohexanol, 2,6-dimethylcyclohexanol, 3,5-dimethylcyclohexanol, 2-ethylcyclohexanol, 4-ethylcyclohexanol, 1-octanol, 6-methyl-5-hepten-2-ol, 1-octen-3-ol, 6-methyl-2-heptanol, 2-(cyclohexyloxy)ethanol, 2,2-dimethoxycyclohexanol, 2,4,4-trimethyl-1-pentanol, 1-phenyl-1-propanol, 1-phenyl-2-propanol, 2-phenyl-2-propanol, 3-nonyn-1-ol, 2,4-dimethyl-2,6-heptadien-1-ol, 3-cyclohexyl-1-propanol, 3,5,5-trimethyl-2-cyclohexen-1-ol, 3-nonen-1-ol, 3-ethyl-2,2-dimethyl-3-pentanol, 1-nonanol, 1-myrtenol, 2-phenyl-3-butyn-2-ol, 1-phenyl-1-cyclopropanemethanol, 2-methyl-1-phenyl-2-propanol, isopulegol, linalool, 1-myrtenol, nerol, terpineol, terpinen-4-ol, citronellol, 4-cyclohexyl-1-butanol, 2-decanol, 4-decanol, mixed $C_7/C_{11}$ alcohols, isodecyl alcohol, hexyl decyl alcohol, 1,3-dibromo-2-propanol, 2,3-dibromopropanol, 1,3-dichloro-2-propanol, 1,3-difluoro-2-propanol, 3-bromo-1-propanol, 3-chloro-1-propanol, 4-chloro-1-butanol, 2-(methylthio)ethanol, 3-bromo-3-buten-1-ol, 3-pyrrolidinol, 1,4-dibromo-2-butanol, 2-(2-chloroethoxy) ethanol, 3-methylthio-1-propanol, 3-thiophenemethanol, 2,2-bis(chloromethyl)-1-propanol, tetrahydro-4H-pyran-4-ol, 3-bromo-2,2-dimethyl-1-propanol, 2-(3-thienyl)ethanol, 3-chloro-2,2-dimethyl-1-propanol, 1-methyl-3-pyrrolidinol, 4-(methylthio)-1-butanol, 2-(trimethylsilyl)ethanol, 2-(2-thienyl)ethanol, tetrahydropyran-2-methanol, 6-bromo-1-hexanol, 6-chloro-1-hexanol, 7-bromo-1-heptanol, N,N-diethylethanolamine, 1-methyl-2-pyrrolidinemethanol, 1-piperideneethanol, 3-(methylthio)-1-hexanol, 3-diethylamino-1-propanol, 2-(diisopropylamino) ethanol and 2-{[2-(dimethylamino) ethyl]methylamino}ethanol. Of these, 3-furanmethanol, furfuryl alcohol, tetrahydrofurfuryl alcohol, 3-acetyl-1-propanol, 2-isopropoxyethanol, 3-methoxy-1-butanol, 2-cyclohexen-1-ol, 1,5-hexadien-3-ol, t,t-2,4-hexadien-1-ol, 3-hexyn-1-ol, 5-hexyn-1-ol, cyclopentanemethanol, 4-methyl-1-pentanol, 3-(trimethylsilyl)allyl alcohol, cyclohexylmethanol, 3-trimethylsilyl-1-propanol, benzyl alcohol, 3-cyclohexen-1-methanol, 3-methyl-2-cyclohexen-1-ol, cycloheptanol, 1-methylcyclohexanol, 2-methylcyclohexanol, 3-methylcyclohexanol, 4-methylcyclohexanol, 1-heptanol, 2-heptanol, propylene glycol butyl ether, 2-methylbenzyl alcohol, 3-methylbenzyl alcohol, 4-methylbenzyl alcohol, phenethyl alcohol, sec-phenethyl alcohol, 1-octyn-3-ol, cycloheptanemethanol, 2-cyclohexylethanol, 1-cyclohexylethanol, cyclooctanol, 3-cyclopentyl-1-propanol, 2,3-dimethylcyclohexanol, 2,6-dimethylcyclohexanol, 3,5-dimethylcyclohexanol, 2-ethylcyclohexanol, 4-ethylcyclohexanol, 6-methyl-5-hepten-2-ol, 1-octen-3-ol, 2-(cyclohexyloxy)ethanol, 2,2-dimethoxycyclohexanol, 6-methyl-2-heptanol, 1-octanol, 2,4,4-trimethyl-1-pentanol, 1-phenyl-1-propanol, 1-phenyl-2-propanol, 2-phenyl-2-propanol, 2,4-dimethyl-2,6-heptadien-1-ol, 3-nonyn-1-ol, 3,5,5-trimethyl-2-cyclohexen-1-ol, 3-cyclohexyl-1-propanol, 3-nonen-1-ol, 1-nonanol, 3-ethyl-2,2-dimethyl-3-pentanol, 2-phenyl-3-butyn-2-ol, 1-phenyl-1-cyclopropanemethanol, 1-myrtenol, isopulegol, 2-methyl-1-phenyl-2-propanol, linalool, 1-myrtenol, nerol, terpineol, terpinen-4-ol, citronellol, 2-decanol, 4-decanol, 4-cyclohexyl-1-butanol, mixed $C_7/C_{11}$ alcohols, isodecyl alcohol and hexyl decyl alcohol are preferred, while 3,3-diethoxy-1-propanol, 2-(2-methoxy)ethoxyethanol, 3,4-dimethyl-1-hexanol, 2-butoxyethanol, di(propylene glycol) methyl ether, 3-ethyl-1-hexanol, 2-ethyl-1-hexanol, 3,5-dimethyl-1-hexanol, 3-methyl-1-heptanol, 4-methyl-1-heptanol, 5-methyl-1-heptanol, 2-octanol, 3-octanol, 2-propyl-1-pentanol, 2,6-dimethyl-4-heptanol, 2-nonanol, 3,5,5-trimethyl-1-hexanol, dihydromyrcenol, 3,7-dimethyl-1-octanol, 3,7-dimethyl-3-octanol, mixed $C_7/C_9$ alcohols, isooctyl alcohol and mixed $C_9$ alcohols are most preferred.

The total organic bromine content of the bromobenzoate is an important factor for efficiency as a flame retardant, and can be adjusted by the alcohol and/or solvent used in the synthesis and/or the catalyst loading and/or the number of bromines on the aromatic ring. In one aspect of the invention the total organic, aromatically-bound bromine content of the bromobenzoate falls within the range of 50–65%. In another aspect of the invention where the plasticizing nature of the bromobenzoate is of primary importance, the total organic, aromatically-bound bromine content of the bromobenzoate is between 10% and 65%.

As will be appreciated by persons skilled in the art, the bromobenzoate compound is incorporated into thermoset polymers such as polyurethanes by including the bromobenzoate in the polyurethane mixture as the polymer is prepared. This process has been referred to as the "one-shot" technique, and is described with more particularity in common reference materials such as the Modern Plastics Encyclopedia, Vol. 71, No. 12 (1994), and was used in Examples 11 through 15 below.

The incorporation of bromobenzoates into polyvinyl chlorides may be accomplished either by including the desired tetrabromobenzoate in the mixture as the polyvinyl chloride is being formed, or by incorporating the bromobenzoate into polymerized polyvinyl chloride. Specific techniques for incorporating additives such as bromobenzoates into thermoplastics such as PVC are known to the art and may be used to accomplish that step of the present invention.

As will be understood, the level of bromobenzoate incorporated into the polymer resin to provide an effective flame retarding amount will vary widely in accordance with many factors such as the particular resin used, the application contemplated, other additives present, etc. Typically, the bromobenzoate will be incorporated at levels between about 2% and 50% of the total system weight, and more commonly at levels between about 5% and 30% of the total system weight.

It will be understood that other conventional additives may also be incorporated into the polymer systems. For example, the bromobenzoate product can be incorporated along with other brominated flame retardant compounds; however, it is preferred in this regard that the bromobenzoate compound constitute a predominant portion (i.e. greater than 50% by weight) of the total amount of brominated flame retardant included in the system. Flame retardant materials such as oxides of Group V elements, especially antimony oxides, and/or phosphorous-containing compounds, can also be included. Additional conventional additives may include antioxidants, antistatic agents, colorants, fibrous reinforcements, fillers, foaming/blowing agents, catalysts, heat stabilizers, impact modifiers, lubricants, plasticizers, processing aids, UV light stabilizers, crosslinking/curing agents, etc.

In another aspect of the invention bromobenzoates such as tetrabromobenzoates are used as plasticizers for materials such as PVC and rubber. These benzoates are useful as secondary plasticizers to replace a portion of the primary plasticizer, often a phthalate, as well as plasticizers on their own, without regard to their performance as flame retardants. Thus, these bromobenzoates can be incorporated as plasticizers in polymer resin systems including polurethanes and polyvinyl chlorides, wherein the systems are already otherwise flame retardant, i.e. without regard to the bromobenzoate incorporated.

Mixtures of bromobenzoates containing a quantity of phthalate and smaller amounts of other impurities can be used in the invention. Mixtures containing 50% or more bromobenzoate, and preferably 65% or more bromobenzoate, are within the scope of this patent and are further described in the following examples.

Reference will now be made to specific examples using the processes described above. It is to be understood that the examples are provided to more completely describe preferred embodiments, and that no limitation to the scope of the invention is intended thereby.

EXAMPLE 1

Synthesis of 2-ethylhexyltetrabromobenzoate From 2,3,4,5-tetrabromobenzoic Acid 2,3,4,5-Tetrabromobenzoic acid (438 g, 1.0 mole) prepared via the decarboxylation of tetrabromophthalic anhydride, 2-ethylhexanol (195 g, 1.5 moles) and titanium isopropoxide (2.2 g, 0.008 mole) were charged to a stirred, glass vessel. The mixture was heated at 200° C. in nitrogen atmosphere under stirring for 8 hours with the water of reaction being collected in a Dean-Stark trap. The resulting dark-brown reaction mixture was cooled to 90° C. and neutralized by stirring with solid $Na_2CO_3$ $10H_2O$ (5 wt % on the reaction mixture) at 90° C. for 1 hour. Following a steam-strip to remove excess 2-ethylhexanol, the product was filtered to remove the insoluble solid contaminants. A clear, dark-brown liquid was obtained (533 g, 97% yield). This crude product was distilled at 192°–194° C. and 0.1–0.2 mmHg. A total of 527 g of pale yellow, clear liquid was obtained (99% recovery). GLC assay 96.2% tetrabromobenzoate; OBr 56.6% (58.1% theory); acidity 0.15 meq.KOH/100 g; TGA 5% wt. loss at 271° C.; Gardner Color 3.

EXAMPLE 2

Synthesis of 2-ethylhexyldibromobenzoate From Dibromophthalic Anhydride in 2-ethylhexanol Solvent Using Sodium Bicarbonate Catalyst Dibromophthalic anhydride (153 g, 0.50 moles), 2-ethylhexanol (196 grams, 1.5 moles), and sodium bicarbonate (3.8 g, 0.045 moles) are charged to a stirred, glass vessel. The mixture is heated to reflux, with the water of reaction being collected in a Dean-Stark trap. After CO2 evolution ceases, the reaction is cooled and filtered to remove the catalyst. Excess 2-ethylhexanol is removed vis vacuum distillation to yield a liquid product. Product organic bromine content is about 38%.

EXAMPLE 3

Synthesis of 2-ethylhexyltetrabromobenzoate From Tetrabromophthalic Anhydride in 2-ethylhexanol Solvent Using Sodium Bicarbonate Catalyst Tetrabromophthalic anhydride (232 g, 0.50 moles), 2-ethylhexanol (196 g, 1.5 moles), and sodium bicarbonate (3.8 g, 0.045 moles) were charged to a stirred, glass vessel. The mixture was heated to reflux, with the water of reaction being collected in a Dean-Stark trap. After $CO_2$ evolution ceased (approx. 3.5 hours), the reaction was cooled and filtered to remove the catalyst. The excess 2-ethylhexanol was stripped off under vacuum yielding a clear, amber liquid product. GLC assay indicated 76.1% tetrabromobenzoate and 13.0% tetrabromophthalic diester; organic bromide ("OBr") of 55.16%; TGA 5% wt. loss 217° C.; Gardner color 11.

EXAMPLE 4

Synthesis of 2-ethylhexyltetrabromobenzoate From Tetrabromophthalic Anhydride in 2-ethylhexanol Solvent Using Potassium Bicarbonate Catalyst Tetrabromophthalic anhydride (232 g, 0.50 moles), 2-ethylhexanol (196 g, 1.5 moles), and potassium bicarbonate (5.5 g, 0.055 moles) were charged to a stirred, glass vessel. The mixture was heated to reflux, with the water of reaction being collected in a Dean-Stark trap. After $CO_2$ evolution ceased (approx. 3.5 hours), the reaction was cooled and filtered to remove the catalyst. The excess 2-ethylhexanol was stripped off under vacuum yielding a clear, amber liquid product. GLC assay 66.7% tetrabromobenzoate, 15.8% tetrabromophthalic diester; OBr 54.04%; TGA 5% wt. loss 221° C.; Gardner color 12.

EXAMPLE 5

Synthesis of 2-ethylhexyltetrabromobenzoate From Tetrabromophthalic Anhydride in 2-ethylhexanol Solvent Using Potassium Carbonate Catalyst Tetrabromophthalic anhydride (464 g, 1.0 moles), 2-ethylhexanol (391 g, 3.0 moles), and potassium carbonate (15.1 g, 0.11 moles) were charged to a stirred, glass vessel. The mixture was heated to reflux, with the water of reaction being collected in a Dean-Stark trap. After $CO_2$ evolution ceased (approx. 3.5 hours), the reaction was cooled and filtered to remove the catalyst. The excess 2-ethylhexanol was stripped off under vacuum yielding a clear, amber liquid product. GLC assay 63.5% tetrabromobenzoate, 11.5% tetrabromophthalic diester; OBr 52.29%; THA 5% wt. loss 235° C.; Gardner color 14.

EXAMPLE 6

Synthesis of 2-ethylhexyltetrabromobenzoate From Tetrabromophthalic Anhydride in 2-ethylhexanol Solvent Using Lithium Carbonate Catalyst Tetrabromophthalic anhydride (464 g, 1.0 moles), 2-ethylhexanol (390 g, 3.0 moles), and lithium carbonate (8.1 g, 0.11 moles) were charged to a stirred, glass vessel. The mixture was heated to reflux, with the water of reaction being collected in a Dean-Stark trap. After $CO_2$ evolution ceased (approximately 8.0 hours), the reaction was cooled and filtered to remove the catalyst. The excess 2-ethylhexanol was stripped off under vacuum yielding a clear, amber liquid product. GLC assay 60.7% tetrabromobenzoate, 10.4% tetrabromophthalic diester; OBr 51.9%; TGA 5% wt. loss 240° C.

EXAMPLE 7

Synthesis of 2-ethylhexyltetrabromobenzoate From Tetrabromophthalic Anhydride in 2-ethoxyethylether Solvent Tetrabromophthalic anhydride (1391 g., 3.00 moles), 2-ethylhexanol (469 g, 3.60 moles), 2-ethoxyethylether (771 g, 4.75 moles), and sodium bicarbonate (25 g, 0.30 moles) were charged to a stirred, glass vessel. The mixture was brought to reflux, with the water of reaction being collected in a Dean-Stark trap. After $CO_2$ evolution had ceased (approximately 3 hours), the reaction was cooled and filtered to remove the catalyst. The 2-ethoxyethylether and excess 2-ethylhexanol were stripped off under vacuum yielding a clear, amber liquid product. GLC assay 85.0% tetrabromobenzoate, 1.6% tetrabromophthalic diester; OBr 56.99%; TGA 5% wt. loss 209° C., Gardner color 11.

EXAMPLE 8

Synthesis of 2-butoxyethyltetrabromobenzoate

Tetrabromophthalic anhydride (232 g, 0.5 moles), 2-butoxyethanol (226 g, 1.9 moles), and potassium bicarbonate (8.3 g, 0.083 moles) were charged to a stirred, glass vessel. The mixture was heated to reflux, with the water of reaction being collected in a Dean-Stark trap. After $CO_2$ evolution had ceased (approximately 3 hours), the reaction was cooled and filtered to remove the catalyst. Excess 2-butoxyethanol was stripped off under vacuum yielding a clear, amber product. GLC assay 82.4% tetrabromobenzoate, 7.9% tetrabromophthalic diester; OBr 57.84%; TGA 5% wt. loss 225° C.; Gardner color 13.

EXAMPLE 9

Synthesis of 2-methoxyethoxyethyltetrabromobenzoate

Tetrabromophthalic anhydride (232 g, 0.5 moles), 2-methoxyethoxyethanol (238 g, 2.0 moles), and potassium bicarbonate (8.3 g, 0.083 moles) were charged to a stirred, glass vessel. The mixture was heated to reflux, with the water of reaction being collected in a Dean-Stark trap. After $CO_2$ evolution had ceased (approximately 2 hours), the reaction was cooled and filtered to remove the catalyst. Excess 2-methoxyethoxyethanol was stripped off under vacuum yielding a clear, amber product. GLC assay 81.2% tetrabromobenzoate, 0.4% tetrabromophthalic diester; OBr 59.82%; TGA 5% wt. loss 180° C.; Gardner color 14.

EXAMPLE 10

Synthesis of Tetrabromobenzoates From Mixed $C_7/C_9$ Alcohols

Tetrabromophthalic anhydride (464 g, 1.0 moles), BASF $C_7/C_9$ alcohol (500 mls), and sodium bicarbonate (8.4 g, 0.10 moles) were charged to a stirred, glass vessel. The mixture was heated to reflux, with the water of reaction being collected in Dean-Stark trap. After $CO_2$ evolution had ceased (approximately 3.5 hours), the reaction was cooled and filtered to remove the catalyst. Excess alcohol was stripped off under vacuum yielding a clear, golden colored product. OBr 52.77%; TGA 5% wt. loss 231° C.; Gardner color 5.

EXAMPLE 11

Use of a Tetrabromobenzoate in Flexible Polyurethane Foam

The 2-ethylhexyltetrabromobenzoate of Example 3 was added to flexible polyurethane foam prepared by the formulation below. All components are expressed in parts by weight.

| Component | Parts by Weight |
|---|---|
| 3,000 molecular weight glycerine based heteropolyol | 100 |
| 2-ethylhexyltetrabrombenzoate of Example 3 | 18 |
| Water | 4.5 |
| Amine catalyst (triethylene diamine/dimethylaminoethyl ether) | 0.33 |
| L-620 silicone surfactant* | 0.9 |
| Stannous octoate | 0.25 |
| Toluene diisocyanate (80/20) | 51.2 |

*product of OSI Specialties

Lab preparation yielded a flexible polyurethane foam with a density of 1.5 lb/ft$^2$ and an airflow of 4.0. The foam met the criteria of the California Bulletin 117 combustibility test part A with an average burn distance of 2.5 inches and no burn time. It also met the criteria of part D with a weight retention in the smolder test in excess of 98%.

EXAMPLE 12

Use of 2-Ethylhexyltetrabromobenzoate/aryl Phosphate Blend in Flexible Polyether Polyurethane Foam The bromobenzoate of Example 3 was added to a flexible polyether polyurethane foam similar to that of the previous example except that the water content was increased to lower the density. A lower density foam has the characteristic of being more difficult to flame retard. To further enhance the flammability test performance, 6.7 parts of a triaryl phosphate were added. This phosphate can be added separately or blended with the bromobenzoate to give an enhanced product.

| Component | Parts by Weight |
|---|---|
| 3,000 molecular weight glycerine based heteropolyol | 100 |
| 2-ethylhexyltetrabromobenzoate of Example 3 | 20 |
| Water | 6.6 |
| Amine catalyst (triethylene diamine/dimethylaminoethyl ether) | 0.6 |
| L-620 silicone surfactant* | 0.8 |
| Stannous octoate | 0.35 |
| Toluene diisocyanate (80/20) | 79.46 |

*product of OSI Specialties

The resulting foam had a density of 1.3 lb/cu. ft. and an air flow of 6.7 Scfm. The foam met the criteria of California Bulletin 117 with an average void length of 0.5 inches, 0 seconds burn time in the open flame test. The foam also met the criteria of MVSS-302, a flammability test for components of automotive interiors.

A foam prepared which contained the aryl phosphate without the bromobenzoate of Example 3 failed the California Bulletin 117 flammability test. The burn time exceeded 25 seconds and the void length was greater than 10 inches. The density of this foam was 1.3 lb/cu. ft. with an air flow of 5.1 Scfm.

EXAMPLE 13

Use of Other Tetrabromobenzoates in Flexible Polyether Polyurethane Foam

The 2-butoxyethyltetrabromobenzoate of Example 8 and the 2-methoxyethoxyethyltetrabromobenzoate of Example 9 were also observed to perform well as flame retardants in flexible polyether polyurethane foam. The formulation below differed slightly from those of Examples 11 and 12 above.

| Component | Parts by Weight |
| --- | --- |
| 3,000 molecular weight glycerine based heteropolyol | 100 |
| Tetrabromobenzoate of Example 8 or 9 | 23 |
| Water | 4.5 |
| Amine catalyst (triethylene diamine/dimethylaminoethyl ether) | 0.5 |
| L-620 silicone surfactant* | 0.9 |
| Stannous octoate | 0.4 |
| Toluene diisocyanate (80/20) | 57.15 |

*product of OSI Specialties

Foams having a density of 1.35 lb/cu. ft. were produced. The air flow of the foam containing the bromobenzoate of Example 8 was 4.9 Scfm. The foam containing the tetrabromobenzoate of Example 9 was more open celled (and hence more flammable) with an air flow of 6.3 Scfm.

The foam containing the tetrabromobenzoate of Example 8 met the criteria of California Bulletin 117 with an average void length of 3.35 inches. The foam containing the tetrabromobenzoate of Example 9 had one test specimen of five which burned in excess of 8 inches.

EXAMPLE 14

Use of Tetrabromobenzoate From Mixed $C_7/C_9$ Alcohols in Flexible Polyether Polyurethane Foam The tetrabromobenzoate of Example 10 was also incorporated into flexible polyether polyurethane foam. It was added to a low density foam in the form of a blend with aromatic phosphate ester to enhance performance.

| Component | Parts by Weight |
| --- | --- |
| 3,000 molecular weight glycerine based heteropolyol | 100 |
| 75/25 blend benzoate of Example 10/ triaryl phosphate ester | 27 |
| Water | 7.6 |
| Amine catalyst (triethylene diamine/dimethylaminoethyl ether) | 0.5 |
| L-620 silicone surfactant* | 1.0 |
| Stannous octoate | 0.36 |
| Toluene diisocyanate (80/20) | 90.11 |

*product of OSI Specialties

To generate a density of 1.08 lb/cu. ft., 5 parts of methylene chloride was added as an auxiliary blowing agent. The air flow was 8.6 Scfm. This very flammable foam met California Bulletin 117 criteria with 27 parts of the benzoate blend. The average void length was 6.3 inches with 0 seconds burn time.

EXAMPLE 15

Use of Tetrabromobenzoate in Flexible Polyester Flexible Polyurethane Foam

The tetrabromobenzoate of Example 3 was added to flexible polyester polyurethane foam prepared using the formulation below. Its performance was compared to that of Tris (dichloropropyl) phosphate, used at the same loading level.

| Component | Parts by Weight |
| --- | --- |
| Witco Fomrez 53 polyester polyol | 100 |
| Bromobenzoate of Example 3 or Tris (dichloropropyl) phosphate | 8 |
| Water | 4.0 |
| Amine catalyst 1 | 0.6 |
| L-532 silicone surfactant* | 1.3 |
| Amine catalyst 2 | 0.2 |
| Toluene diisocyanate (80/20) | 50.4 |

*product of OSI Specialties

Both formulations produced foams which had densities of 2.1 lb/cu. ft. Both met MVSS-302 flammability criteria with an SE (highest) rating. The foam containing the bromobenzoate had better tensile strength initially 19.4 lb/sq. in. vs. 16.5 lb/sq. in. for the foam containing Tris (dichloropropyl) phosphate. It also maintained its tensile properties better after 24 hours humid aging (70° C.), indicating better hydrolytic stability for the benzoate.

EXAMPLE 16

Use of Tetrabromobenzate in Reaction Injection Molded Polyurethane

A commercial flame retardant reaction injection molded (RIM) polyurethane system was used for evaluation of the 2-ethylhexyltetrabromobenzoate of Example 3. The standard RIM system contains 15% of a blend of pentabromodiphenyl oxide and an aromatic phosphate ester (DE-60FS) as a combustibility modifier. RIM parts were molded containing this standard combustion modifier and containing the same level (15%) of a 2:1 blend of 2-ethylhexyltetrabromobenzoate and triethyl phosphate (BB/TEP). Results are tabulated below.

| Combustion Modifier | UL-94 Rating | Heat Distortion Temperature |
| --- | --- | --- |
| 15% DE60FS | V-0 | 59° C. |
| 15% BB/TEP | V-0 | 62° C. |

Both combustion modifiers allowed the polymer system to meet the desired combustibility standard, UL-94 V-0, but the blend containing the tetrabromobenzoate maintained the key physical property, heat distortion, better than the standard combustibility modifier.

EXAMPLE 17

Use of 2-Ethylhexyltetrabromobenzoate in Rigid Polyurethane Foam

The 2-ethylhexyltetrabromobenzoate of Example 3 was added to a rigid polyurethane foam as indicated in the formulation below. The resultant foam, which had good cell structure and a density of 2.1 lbs. per cubic foot, was tested for combustibility in a four foot tunnel designed to correlate with the results obtained on a larger scale in the 25 foot tunnel test (ASTM E-84). The four foot tunnel test consists of a Fisher burner with a 1950° F. butane flame placed under a 4 foot long specimen inclined at an angle of fifteen degrees. Smoke is measured by passing combustion products between a light beam and photocell. Standards with known 25 foot tunnel test values are used for calibration.

| Component | Parts by Weight |
| --- | --- |
| Sucrose polyol (N500 OH#) | 34 |
| Tetrabromophthalate Diol (N215 OH#) | 51 |
| 2-ethylhexyltetrabromobenzoate of Example 3 | 15 |
| L-5440 surfactant (product of OSI Spec) | 1.5 |
| Dimethylcyclohexylamine | 0.8 |
| Dichlorofluoroethane | 24.7 |
| Polymeric MDI (N125 index) | 80.6 |

Combustibility results of four foot tunnel testing of this foam were a predicted flame spread of 19 and smoke evolution of 170. Both are well within the requirements for Class 1 of less than 25 flame spread and 450 smoke for the 25 foot tunnel. Although tetrabromophthalate diol contributes to the combustibility test performance, over 60 parts of this diol are needed in this formulation when the tetrabromobenzoate is not present to attain less than 25 flame spread in the four foot tunnel test.

EXAMPLE 18

Use of 2-Ethylhexyltetrabromobenzoate in Unsaturated Polyester Resin

To an orthophthalic/propylene glycol based resin containing 35% styrene was added 14.5 parts per hundred resin (phr) 2-ethylhexyltetrabromophthalate of Example 3 and 2 phr antimony oxide. An eighth inch thick, 25% glass laminate was prepared using 1.5 oz/yd$^2$ glass mat. This laminate had a V-0 rating when tested by the UL-94 combustibility test. In contrast, the resin without bromobenzoate fails the UL-94 combustibility test.

EXAMPLE 19

Use of 2-Ethylhexyltetrabromobenzoate in PVC

Bromobenzoates are useful in polyvinyl chloride (PVC) both as flame retardants and as plasticizers. Many applications require both flexibility and enhanced flame resistance. The bromobenzoates of Examples 3 and 10 were compared to brominated dioctylphthalate as a secondary plasticizer in the formulation below at 20 parts by weight. Processing was on a two roll mill at 420° F. for two minutes. Samples were compression molded at 350° F.

| Component | Parts by Weight |
| --- | --- |
| Geon Corp. Geon 30 PVC resin | 100 |
| Lead stabilizer | 5 |
| Lubricant | 0.2 |
| Antimony oxide | 2.0 |
| Clay | 30 |
| Alumina trihydrate | 20 |
| Phthalate plasticizer | 30 |

Plasticizing characteristics were compared by measuring stress, strain, and modulus of tensile bars. Flammability was assayed using the Oxygen Index Test.

| | Avg. Stress @ Max Load | % Strain @ Auto Break | Modulus (psi) |
| --- | --- | --- | --- |
| Bromobenzoate of Example 3 | 2400 | 250 | 5000 |
| Brominated DOP | 2200 | 350 | 3600 |
| Bromobenzoate of Example 10 | 2400 | 270 | 5200 |

The presence of bromobenzoate increased the modulus while reducing the strain. However, there was little difference in the stress at break. The oxygen index improved when the bromobenzoates were included.

EXAMPLE 20

Use of Tetrabromobenzoate in Epoxy Resin

An epoxy resin consisting of an epichlorohydrin-bisphenol A condensation product is blended with the bromobenzoate of Example 8 and a quantity of antimony oxide synergist. To this blend is slowly added a quantity of amine hardner over several minutes. The mixture is then poured into 1/16" thick molds and placed into a 55° C. oven overnight (16 hours).

A further cure cycle of 2 hours at 125° C. followed by two hours at 155° C. is followed by cooling to room temperature and cutting test specimens to size. Two flammability tests are performed, oxygen index and UL-94. Results appear below.

| FLAME RETARDANT | OXYGEN INDEX | UL-94 RATING |
| --- | --- | --- |
| None | 27 | Fail |
| 10% bromobenzoate | 33 | — |
| 13.3% bromobenzoate | 35 | — |
| 16% bromobenzoate/ 4% antimony oxide | — | V-0 |

It can be seen from the above that bromobenzoates are effective flame retardants in epoxy resin systems.

EXAMPLE 21

Use of a Tetrabromobenzoate in Rubber

The tetrabromobenzoate of Example 9 (from mixed $C_7/C_9$ alcohols) is added to a rubber conveyor belt cover. The rubber is a 50/50 blend of cis-polyisoprene and cis-polybutadiene with 70 parts N-220 carbon black and 40 parts naphthenic oil. A second rubber is formulated substituting 30 parts of the tetrabromobenzoate of Example 9 for 30 parts of the oil.

Bars measuring ½"×5"×⅛" are tested by limiting oxygen index (ASTM D-2863). The rubber containing 40 parts oil has an oxygen index of 20. Substituting 30 parts of the brominated benzoate of Example 9 raises the oxygen index to 23.

Tensile strength increases only slightly, from 3300 to 3500 psi with the substitution of the benzoate of Example 9. Shore A hardness goes from 65 to 70.

EXAMPLE 22

Use of Dibromobenzoate As Plasticizer in PVC

The following components are blended and dropped onto a two-roll mill at 230° C. for two minutes:

| Component | Parts by Weight |
|---|---|
| PVC resin: | 100 |
| CaCO₃ | 800 |
| Dibromobenzoate of Ex. 2 | 40 |
| Stabilizer | 10 |
| Tackifier | 5 |

The formed, plasticized PVC resin demonstrates low levels of release of volatiles, for example as compared to a similar formulation employing dioctyl phthalate as the plasticizer.

While the invention has been illustrated and described in detail in the foregoing description, the same is to be considered as illustrative and not restrictive in character, it being understood that only the preferred embodiment has been described and that all changes and modifications that come within the spirit of the invention are desired to be protected.

We claim:

1. A method of providing flame retarded polyurethanes, comprising including 2% to 50%, by weight, of a bromobenzoate compound of the formula:

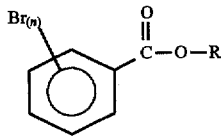

wherein n is an integer from 1 to 5 and R is derived from an alcohol with a boiling point of between 160° C. and 230° C. as a component of the polyurethane mixture.

2. A method according to claim 1 wherein said polyurethane is a flexible polyurethane.

3. A method according to claim 1 wherein said polyurethane is a flexible polyether polyurethane.

4. A method according to claim 1 wherein said polyurethane is a flexible polyester polyurethane.

5. A method according to claim 1 wherein said polyurethane is a reaction injection molded (RIM) polyurethane system.

6. A method according to claim 1 wherein said polyurethane is a rigid polyurethane.

7. A method according to claim 1 wherein said bromobenzoate compound is of the formula:

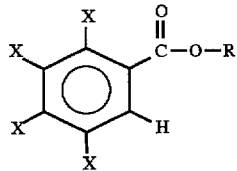

wherein each X is —Br or —H, with the proviso that at least one X is —Br.

8. The method of claim 7, wherein each X is —Br.

9. The method of claim 8, wherein said compound is selected from the group 2-ethylhexyltetrabromo-benzoate, 2-butoxyethyltetrabromo-benzoate, and 2-methoxyethoxyethyl-tetrabromobenzoate.

10. A method of improving the flame retardency of unsaturated polyester resins comprising incorporating 2% to 50%, by weight, of a bromobenzoate compound of the formula:

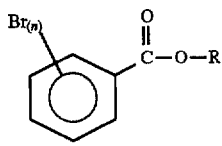

wherein n is an integer from 1 to 5 and R is derived from an alcohol with a boiling point of between 160° C. and 230° C. into the unsaturated polyester resin.

11. A method of providing flame retarded polyvinyl chloride, comprising incorporating 2% to 50%, by weight, of a bromobenzoate compound of the formula:

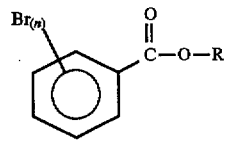

wherein n is an integer from 1 to 5 and R is derived from an alcohol with a boiling point of between 160° C. and 230° C. into the polyvinyl chloride.

12. A method of providing plasticity to a polyvinyl chloride, comprising incorporating 2% to 50%, by weight, of a bromobenzoate compound of the formula:

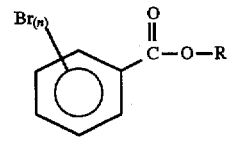

wherein n is an integer from 1 to 5 and R is derived from an alcohol with a boiling point of between 160° C. and 230° C. into the polyvinyl chloride.

13. A method of improving the flame retardency of epoxy resins comprising incorporating 2% to 50%, by weight, of a bromobenzoate compound of the formula:

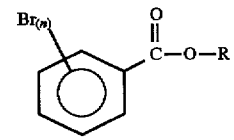

wherein n is an integer from 1 to 5 and R is derived from an alcohol with a boiling point of between 160° C. and 230° C. into the epoxy resin.

14. A method according to claim 13 wherein said bromobenzoate compound is 2-methoxyethoxyethyltetrabromobenzoate.

15. A method of improving the plasticity of rubber, comprising incorporating 2% to 50%, by weight, of a bromobenzoate compound of the formula:

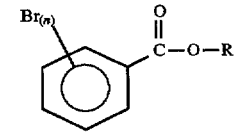

wherein n is an integer from 1 to 5 and R is derived from an alcohol with a boiling point of between 160° C. and 230° C. into the rubber.

16. A flame retarded polyurethane composition, comprising a polyurethane polymer and 2% to 50%, by weight, of a bromobenzoate compound of the formula:

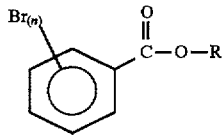

wherein n is an integer from 1 to 5 and R is derived from an alcohol with a boiling point of between 160° C. and 230° C.

17. A composition according to claim 16 wherein said polyurethane is a reaction injection molded polyurethane.

18. A composition according to claim 16 wherein said bromobenzoate compound is 2-ethylhexyltetrabromobenzoate.

19. A composition according to claim 16 wherein said bromobenzoate compound is 2-butoxyethyltetrabromobenzoate.

20. A composition according to claim 16 wherein said bromobenzoate compound is 2-methoxyethoxyethyltetrabromobenzoate.

21. A flame retarded polyester composition, comprising an unsaturated polyester resin incorporating 2% to 50%, by weight, of a bromobenzoate compound of the formula:

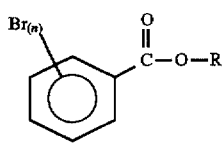

wherein n is an integer from 1 to 5 and R is derived from an alcohol with a boiling point of between 160° C. and 230° C.

22. A flame retarded polyvinyl chloride composition, comprising a polyvinyl chloride polymer incorporating 2% to 50%, by weight, of a bromobenzoate compound of the formula:

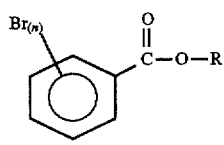

wherein n is an integer from 1 to 5 and R is derived from an alcohol with a boiling point of between 160° C. and 230° C.

23. A plasticized polymer composition, comprising polyvinyl chloride incorporating 2% to 50%, by weight, of a bromobenzoate compound of the formula:

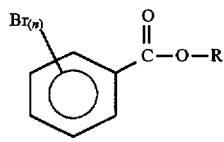

wherein n is an integer from 1 to 5 and R is derived from an alcohol with a boiling point of between 160° C. and 230° C.

24. A flame retarded epoxy composition, comprising an epoxy resin incorporating 2% to 50%, by weight, of a bromobenzoate compound of the formula:

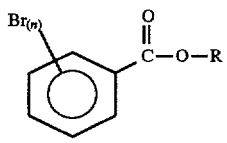

wherein n is an integer from 1 to 5 and R is derived from an alcohol with a boiling point of between 160° C. and 230° C.

25. A composition according to claim 24 wherein said bromobenzoate compound is 2-methoxyethoxyethyltetrabromobenzoate.

26. A plasticized rubber composition, comprising rubber and 2% to 50%, by weight, of a bromobenzoate compound of the formula:

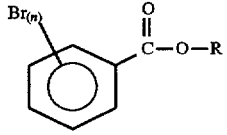

wherein n is an integer from 1 to 5 and R is derived from an alcohol with a boiling point of between 160° C. and 230° C.

27. A flame retarded polymer composition, comprising:
a polymer resin selected from the group consisting of polyurethane, polyvinyl chloride, and epoxy resins; and
a flame retardant system including a brominated organic flame retardant component including one or more brominated organic flame retardants, wherein said brominated organic flame retardant component is at least about 50% by weight comprised of one or more bromobenzoate compounds of the formula:

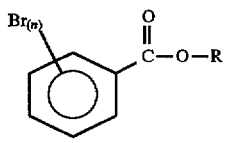

wherein n is an integer from 1 to 5 and R is derived from an alcohol with a boiling point of between 160° C. and 230° C.

28. The composition of claim 27, wherein said brominated organic flame retardant component consists essentially of one or more bromobenzoate compounds.

29. A composition of claim 28, wherein said one or more bromobenzoate compounds are encompassed by the formula:

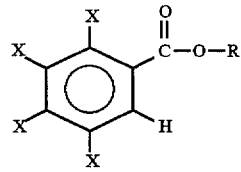

wherein each X is —Br or —H, with the proviso that at least one X is —Br.

30. A composition according to claim 29, wherein each X is —Br.

31. A composition according to claim 30, wherein said bromobenzoate compound is selected from the group consisting of 2-ethylhexyltetrabromobenzoate, 2-butoxyethyltetrabromo-benzoate, and 2-methoxyethoxyethyltetrabromobenzoate.

* * * * *